United States Patent [19]
Gardineer et al.

[11] 3,969,990
[45] July 20, 1976

[54] SELF-SNUBBING MINIATURE PISTON ASSEMBLY

[75] Inventors: Bayard G. Gardineer, Patterson; Hugh A. Panissidi, Peekskill, both of N.Y.

[73] Assignee: International Business Machines Corporation, Armonk, N.Y.

[22] Filed: Aug. 2, 1974

[21] Appl. No.: 494,253

Related U.S. Application Data

[63] Continuation of Ser. No. 319,818, Dec. 29, 1972, abandoned.

[52] U.S. Cl. .............................. 92/85 B; 91/396; 91/405
[51] Int. Cl.² .................... F15B 15/22; F01B 11/02
[58] Field of Search ............ 91/394, 392, 405, 404, 91/26, 25, 407; 92/85, 143

[56] References Cited
UNITED STATES PATENTS

| | | | |
|---|---|---|---|
| 2,044,777 | 6/1936 | Erling | 91/404 |
| 2,981,238 | 4/1961 | Brandon | 91/392 |
| 3,082,746 | 3/1963 | Kerridge | 91/405 |
| 3,296,942 | 1/1967 | Nelson | 92/85 |
| 3,559,538 | 2/1971 | Holder | 92/85 |

FOREIGN PATENTS OR APPLICATIONS

| | | | |
|---|---|---|---|
| 719,389 | 12/1954 | United Kingdom | 92/85 |

*Primary Examiner*—Paul E. Maslousky
*Attorney, Agent, or Firm*—Sughrue, Rothwell, Mion, Zinn & Macpeak

[57] ABSTRACT

A miniature piston assembly composed of an elongated cylinder containing a piston head which may be displaced in response to digital hydraulic signals or otherwise and which is arranged to provide self-snubbing without requiring check valves. In the side wall of the cylinder are one or more ports spaced from one or more of the distal ends of the cylinder by a predetermined distance. When the piston is in juxtaposition with a port and approaching the proximate end of the cylinder, the cylinder and the piston define an annular clearance space of ever increasing length and fluid impedance for snubbing the motion of the piston with respect to the cylinder.

22 Claims, 4 Drawing Figures

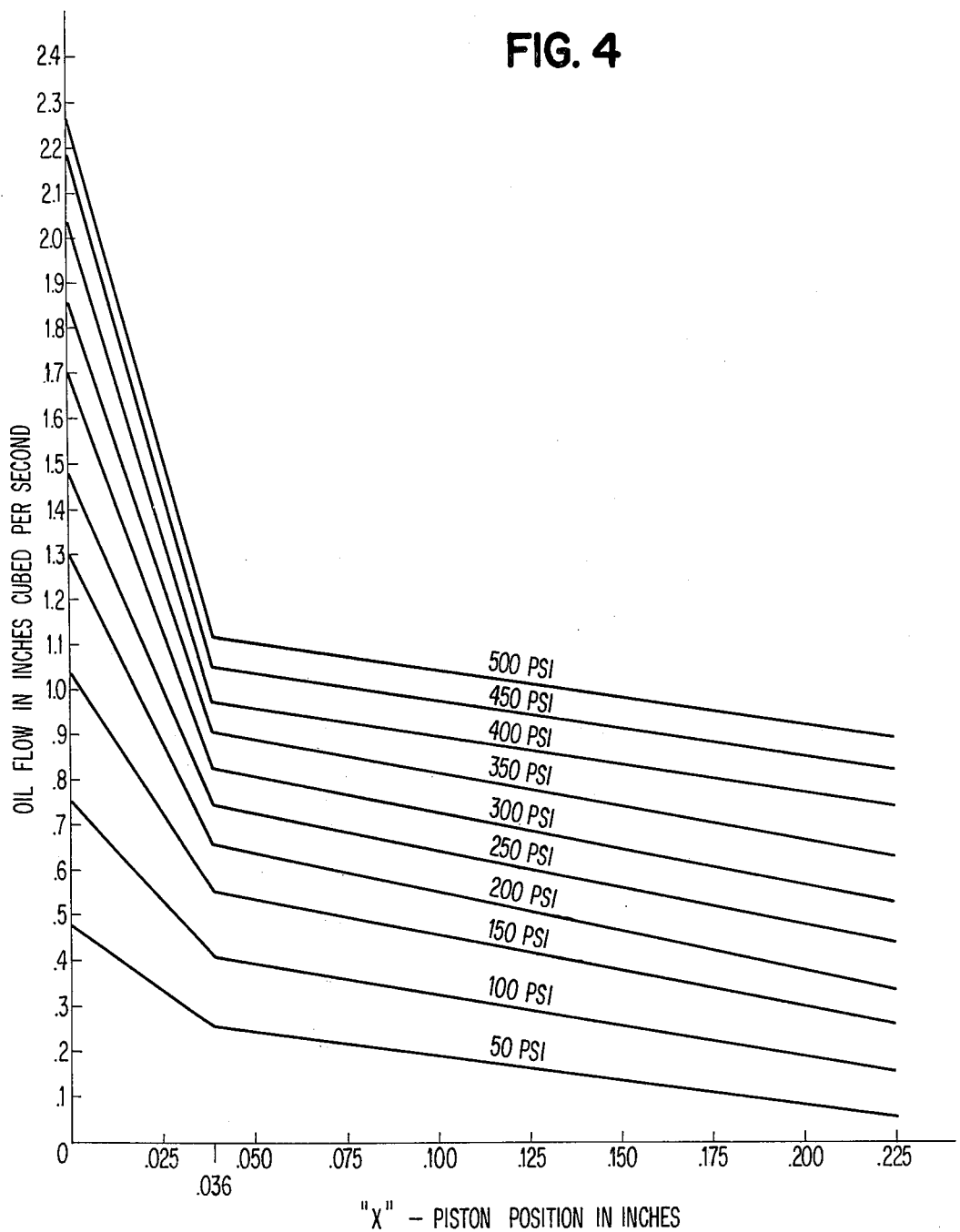

SELF-SNUBBING MINIATURE PISTON ASSEMBLY

This is a continuation of application Ser. No. 319,818, filed Dec. 29, 1972, now abandoned.

BACKGROUND OF THE INVENTION

1. Field of the Invention

This invention relates to miniature pistons, and more particularly it relates to controls for miniature piston adder actuators.

2. Description of the Prior Art

Snubbing the motion of a piston with respect to a cylinder is a common problem in many arts. Various solutions to this problem have been proposed, and it is believed that the article by Albert C. Saurwein, published at pages 80–83 of the July 8, 1971 issue of the magazine *Machine Design* is fairly representative of the state of the art. The kind of solutions to this problem set forth therein have been found satisfactory for many purposes involving conventional pistons and cylinders. However, such solutions have not been found satisfactory for miniaturized pistons which workers in the art have long desired to use in connection with extremely low energy level, fluidic logic circuitry. Such miniaturized pistons would be particularly well-suited for use in general purpose digital computers, for instance in piston adders. Attempts have been made to fabricate such miniaturized piston adders including check valves and ports in parallel with them at each end of each cylinder so that, when the piston approaches a port at the end of the cylinder, the check valve will gradually close so that the port will damp the motion of the piston. However, in miniaturized piston adders, the provision of check valves and accurate orifices is a very difficult engineering problem because the check valves require so much space, and the orifices must be made so very small and to such close tolerances that the mechanism is extremely expensive to manufacture. Again, attempts have been made to use miniaturized piston assemblies without any snubbing means, but this has proved grossly unsatisfactory, often being destructive to the pistons themselves.

SUMMARY OF THE INVENTION

The present invention is designed to overcome the drawbacks of the prior art insofar as miniaturized pistons are concerned. It accomplishes this objective in a deceptively simple, easy to manufacture fashion by providing in the side wall of the miniaturized cylinder one or more ports spaced from one or more of the distal ends of the piston cylinder by a predetermined distance. When the piston is in juxtaposition with one of the ports and approaching the proximate end of the cylinder, the cylinder and the piston define an annular clearance space of ever increasing length and fluid impedance for snubbing the motion of the piston with respect to the cylinder.

BRIEF DESCRIPTION OF THE DRAWINGS

FIG. 4 is a graph giving a straight line idealization taken from the original data generated by the embodiment of the present invention, part of which is depicted in FIG. 3.

DETAILED DESCRIPTION OF PREFERRED EMBODIMENTS

Figure 1:
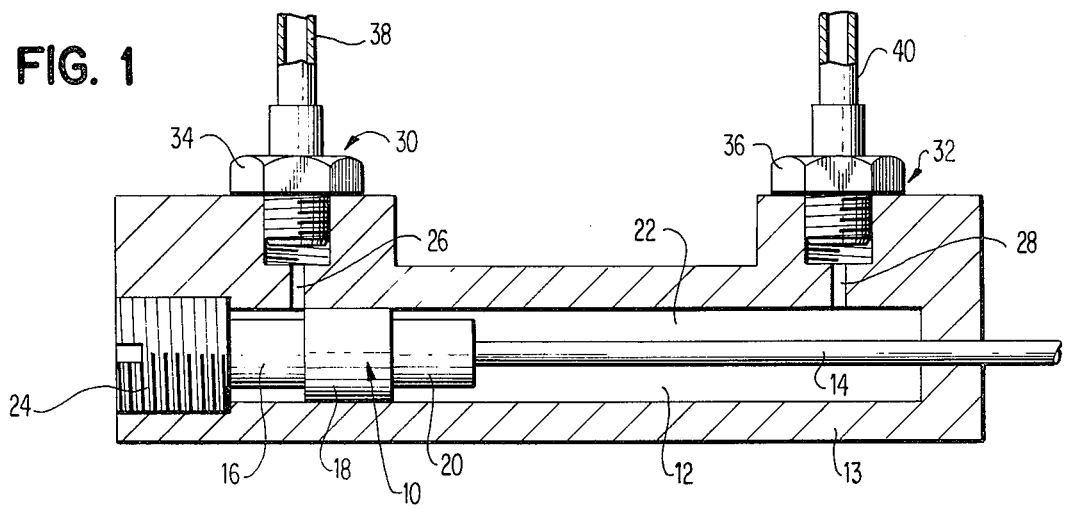
FIG. 1 is a cross-sectional view of one embodiment of the present invention.

In FIG. 1, a piston 10 is disposed in an elongated cylinder 12 formed by a cylinder wall 13. The piston 10 is bonded to a drive rod 14 which may be displaced in response to digital hydraulic signals or otherwise. The head of the piston 10 comprises three concentric cylindrical surfaces 16, 18 and 20. The cylindrical surface 18 fits very snugly against the inner surfaces of the cylinder 12, preventing substantially all flow of a fluid 22, such as oil, contained in the cylinder 12 from one side to the other side of the piston. The diameters of the cylinders 16 and 20 are a few mils smaller than the diameter of the cylinder 18, and they may or may not be equal. The cylinder 12 is closed at one end by the drive rod 14 which passes through and snugly engages a bore formed in the right end of the cylinder wall 13, thereby preventing flow of the fluid 22 out of the cylinder 12 at that end. The other end of the cylinder 12 is closed by a threaded plug 24, which likewise prevents flow of the fluid 22 out that end of the cylinder.

In the wall 13 of the cylinder 12 are two ports, 26 and 28, spaced a predetermined distance from either end of the cylinder 12. These ports are not to be confused with orifices, which are used in the art to restrict the flow of a fluid. Rather, they are simply ports whose diameters are large enough to permit substantially unrestricted flow therethrough. Above the ports 26 and 28 are hose assemblies 30 and 32, which may be of any suitable construction so far as the present invention is concerned. In the embodiments shown, they consist of threaded plugs 34 and 36, with hoses 38 and 40 passing therethrough into communication with ports 26 and 28, respectively. The hoses 38 and 40 are in turn connected to a conventional four-way valve (not shown), which controls the fluid 22 under pressure from a hydraulic power supply (also not shown).

In the preferred embodiment shown, the length of the portion 16 of the cylinder 10 is exactly equal to the snubbing distance, i.e., the distance from the inside edge of the port 26, where the deceleration begins, to the plug 24, which stops the piston at the end of its travel. Such an arrangement is preferred, but is not essential. If the portion 16 of the cylinder 10 were longer, the amount by which it was longer would be wasted, in the sense that it would not contribute to the snubbing action. On the other hand, if the portion 16 of the cylinder 10 were shorter, the portion 18 of the cylinder 10 would partially or wholly obstruct the port 26. If it only partially obstructed the port 26, this could serve as a drastic form of snubbing, but if it wholly obstructed the port 26 and if the fluid 22 is incompressible, it would bring the piston to a stop short of the desired terminus in contact with or immediately adjacent to the plug 24.

In use, when the piston is moving through the center portion of the cylinder 12, fluid flow through the ports is substantially unimpeded, since the ports function as conventional circular ports. The diameter of the ports, line losses, and valve losses are then the only limits on the velocity of the piston.

However, when the piston enters the area of port 26, for example, the effective size of the port is drastically altered. The clearance between the portion 16 of the piston and the inner wall of the cylinder 12 is on the order of 10% of the diameter of the port, and the cross-sectional area of the fluid escape path now becomes an annulus rather than a circle, thereby producing a sudden pressure increase opposing the direction of piston travel and acting as a deceleration force on the piston.

It should be noted that this pressure is not constant, but increases as the piston goes further toward the end of the cylinder. This increase is caused by the fact that the fluid must pass through a path formed by the relatively narrow clearance between the piston and the cylinder before entering the port, and this path gets longer and longer as the piston moves further toward the end of the cylinder. Consequently, it can be seen that the piston has been snubbed (decelerated) without the need for check valves or other devices used in the prior art.

It should also be noted that the port adjacent to the piston when it begins its travel from one end of the cylinder to the other acts as a restriction to the acceleration of the piston. This restriction occurs because the fluid 22 being pumped back into the space behind the moving piston 10 must pass through the annular space between the piston and the cylinder wall 13, and its flow therein is impeded. However, this effect is not as detrimental as might be supposed, because inertial considerations tend to preclude velocity build-up at the start of the stroke anyway.

Figure 2:
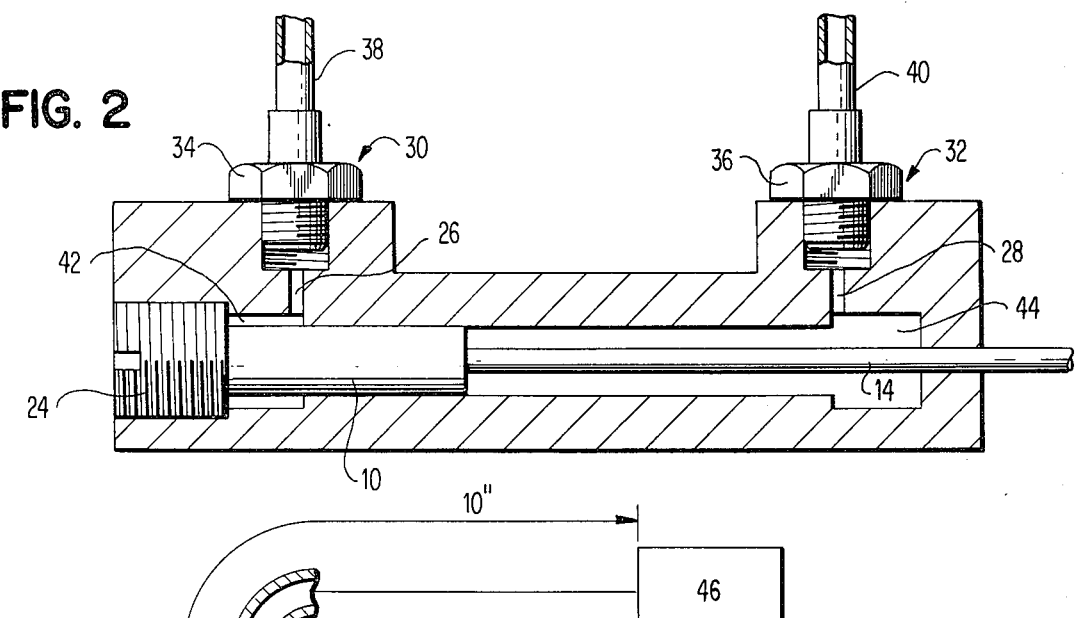
FIG. 2 is a cross-sectional view of another embodiment of the present invention.

It is obvious that an infinite number of embodiments of the present invention may be fabricated by varying port shape and diameter, snubbing distance, and clearance between piston and cylinder. One such embodiment is shown in FIG. 2, and it should be apparent that the embodiments of FIG. 1 and FIG. 2 produce equivalent results. The only difference between the FIG. 1 embodiment and the FIG. 2 embodiment is that undercuts 42 and 44 in the interior walls of the cylinder 12 have replaced the varying diameters of the three cylindrical surfaces 16, 18, and 20 in FIG. 1. Otherwise, the embodiments are identical, and so it is believed that the FIG. 2 embodiment need not be described further.

Figure 3:
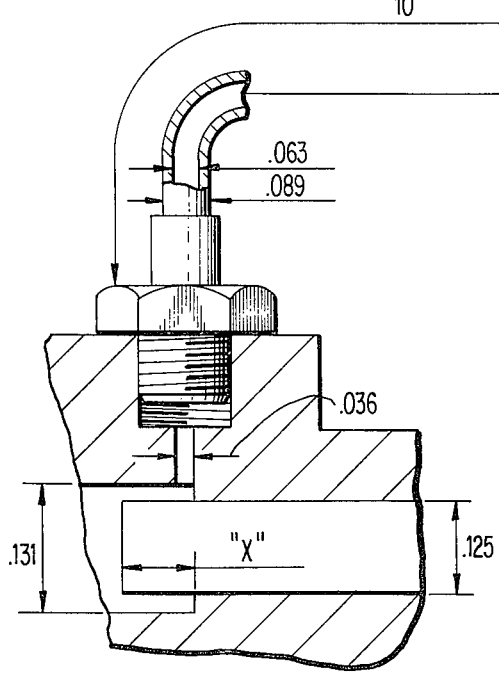
FIG. 3 is a cross-sectional view of part of the embodiment shown in FIG. 2, showing specific dimensions of the device which was used in obtaining the data plotted in FIG. 4.

FIG. 3 is a cross-section of a portion of the embodiment shown in FIG. 2, giving specific dimensions which were used in obtaining the data shown in FIG. 4. As indicated in FIG. 3, both the inner diameter of the cylinder and the outer diameter of the piston are on the order of one-eighth inch in the illustrated embodiments. In FIG. 3, 46 is a flow measuring device, and the fluid contained within the cylinder is incompressible.

FIG. 4 clearly shows the rapid drop in oil flow as the piston enters the region of the port, followed by the gradual drop in oil flow as the piston goes beyond the region of the port. In this figure, X is the distance in inches the leading edge of the piston has travelled beyond the point at which it first draws even with the beginning or inside edge of the port, and each of the several curves respresents the flow rate for a given static pressure as a function of the piston position. It will be readily appreciated that, given the dimension of the piston and the cylinder, the figures for flow rate could be converted into the velocity of the piston. It should also be appreciated that the figure only shows the flow rate up to a cut-off point. In the preferred embodiments, the piston thereafter comes into contact with the end of the cylinder and is brought to a sudden stop thereby. However, if it were not required to stop the piston at a particular, fairly sharply defined spot, it would be possible to simply let the piston come to a gradual stop at an indeterminate spot as the result of the snubbing action.

CAVEAT

While the present invention has been illustrated by detailed descriptions of two preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

We claim:
1. A self-snubbing miniaturized piston assembly comprising:
   a. a cylinder having a diameter on the order of one-eighth inch which is adapted to contain a working fluid, said cylinder also having spaced from one end thereof a port having a cross-sectional area sufficiently large to permit the unimpeded flow of said working fluid, said port serving as both the sole outlet and the sole inlet means for said fluid at that end of said cylinder;
   b. a piston having a diameter on the order of one-eighth inch disposed for reciprocal displacement in said cylinder, said piston having a cross-sectional area at least a first portion thereof sufficient substantially to prevent the flow of said fluid past said first portion when said first portion is in at least a first portion of said cylinder, said piston also having a cross-sectional area at at least a second portion thereof sufficiently smaller than the cross-sectional area of said cylinder at at least as second portion thereof to permit the impeded flow of said fluid between said second portion of said piston and said second portion of said cylinder, the cross-sectional area of said first portion of said piston being equal to the cross-sectional area of said second portion of said piston and said second portion of said cylinder extending from a first end of said cylinder at least to the edge of said port adjacent to said first portion of said cylinder; and
   c. means for displacing said piston in said cylinder, whereby the displacement of said piston is snubbed rapidly as the leading edge of said second portion of said piston passes said port and is thereafter snubbed gradually as the leading edge of said second portion of said piston continues its displacement in said second portion of said cylinder.

2. A self-snubbing, miniaturized piston assembly as claimed in claim 1, wherein: said cylinder also has a second port spaced from the other end thereof; said first portion of said cylinder is located between said first and second ports; said second port is also of a cross-sectional area sufficiently large to permit the unimpeded flow of said working fluid and also serves as both the sole outlet and the sole inlet means for said working fluid at the other end of said cylinder; and said piston is furthermore of a cross-sectional area at at least a third portion thereof which is also sufficiently smaller than the cross-sectional area of said cylinder at at least a third portion of said cylinder to permit the impeded flow of said fluid between said third portion of said piston and said third portion of said cylinder, said third portion of said cylinder extending from the second end of said cylinder to the edge of said second port adjacent to said first portion of said cylinder, whereby the displacement of said piston is snubbed at either end of said cylinder.

3. A self-snubbing miniaturized piston assembly as claimed in claim 2, wherein said third portion of said piston is equal in length to the distance between said second end of said cylinder and said edge of said port adjacent to said first portion of said cylinder.

4. A self-snubbing miniaturized piston assembly as claimed in claim 2 wherein said first, second, and third portions of said miniaturized piston are all cylindrical in shape.

5. A self-snubbing miniaturized piston assembly as claimed in claim 2 wherein the surfaces of said first, second, and third portions of said miniaturized pistons are all formed from infinities of lines parallel to the direction of motion of said miniaturized piston.

6. A self-snubbing miniaturized piston assembly as claimed in claim 1, wherein said second portion of said piston is equal in length to the distance between said first end of said cylinder and said edge of said port adjacent to said first portion of said cylinder.

7. A self-snubbing miniaturized piston assembly as claimed in claim 1 wherein said first and second portions of said miniaturized piston are both cylindrical in shape.

8. A self-snubbing miniaturized piston assembly as claimed in claim 1 wherein the surfaces of said first and second portions of said miniaturized piston are both formed from infinities of lines parallel to the direction of motion of said miniaturized piston.

9. A self-snubbing miniaturized piston assembly as claimed in claim 1 wherein the passage of working fluid between the first portion of said piston and the first portion of said cylinder is prevented solely by the close fit therebetween.

10. A self-snubbing miniaturized piston assembly comprising:
   a. a cylinder having a diameter on the order of one-eighth inch which is adapted to contain a working fluid, said cylinder also having spaced from one end thereof a port having a cross-sectional area sufficiently large to permit the unimpeded flow of said working fluid, said port serving as both the sole outlet and the sole inlet means for said working fluid at that end of said cylinder;
   b. a piston having a diameter on the order of one-eighth inch and of uniform cross-sectional area disposed for reciprocal displacement in said cylinder, a first portion of said cylinder having a cross-sectional area sufficiently small substantially to prevent the flow of fluid past said piston when said piston is in said first portion of said cylinder, said cylinder having a second portion sufficiently larger than said piston to permit the impeded flow of said fluid between said piston and said second portion of said cylinder, said second portion of said cylinder extending from a first end of said cylinder at least to the edge of said port adjacent to said first portion of said cylinder; and
   c. means for displacing said piston in said cylinder, whereby the displacement of said piston is snubbed rapidly as the leading edge of said piston passes said port and is thereafter snubbed gradually as the leading edge of said piston continues its displacement in said second portion of said cylinder.

11. A self-snubbing, miniaturized piston assembly as claimed in claim 10, wherein: said cylinder also has a second port spaced from the other end thereof; said first portion of said cylinder is located between said first and second ports; said second port is also of a cross-sectional area sufficiently large to permit the unimpeded flow of said working fluid and also serves as both the sole outlet and the sole inlet means for said working fluid at the other end of said cylinder; a third portion of said cylinder extending from the second end of said cylinder to the edge of said second port adjacent to said first portion of said cylinder, said third portion of said cylinder being sufficiently larger than said piston to permit the impeded flow of said fluid between said piston and said third portion of said cylinder whereby the displacement of said piston is snubbed at either end of said cylinder.

12. A self-snubbing miniaturized piston assembly as claimed in claim 11 wherein said third portion of said cylinder is equal in length to the distance between said first end of said cylinder and said edge of said port adjacent to said first portion of said cylinder.

13. A self-snubbing iminiaturized piston assembly as claimed in claim 11 wherein said first, second, and third portions of said miniaturized cylinder are all cylindrical in shape.

14. A self-snubbing miniaturized piston assembly as claimed in claim 11 wherein the surfaces of said first, second, and third portions of said miniaturized cylinder are all formed from infinities of lines parallel to the direction of motion of said miniaturized piston.

15. A self-snubbing miniaturized piston assembly as claimed in claim 10 wherein said second portion of said cylinder is equal in length to the distance between said first end of said cylinder and said edge of said port adjacent to said first portion of said cylinder.

16. A self-snubbing miniaturized piston assembly as claimed in claim 10 wherein said first and second portions of said miniaturized cylinder are both cylindrical in shape.

17. A self-snubbing miniaturized piston assembly as claimed in claim 10 wherein the surfaces of said first and second portions of said miniaturized cylinder are both formed from infinities of lines parallel to the direction of motion of said miniaturized piston.

18. A self-snubbing miniaturized piston assembly as claimed in claim 10 wherein the passage of working fluid between said piston and the first portion of said cylinder is prevented solely by the close fit therebetween.

19. A self-snubbing miniaturized piston assembly comprising:
   a. a cylinder having a diameter on the order of one-eighth inch which is adapted to contain a working fluid, said cylinder also having spaced from one end thereof a port having a cross-sectional area sufficiently large to permit the unimpeded flow of said working fluid, said port serving as both the sole outlet and the sole inlet means for said working fluid at that end of said cylinder;
   b. a piston having a diameter on the order of one-eighth inch disposed for reciprocal displacement in said cylinder, said cylinder having a first portion and a second portion, said first portion of said cylinder and at least a first portion of said piston having relative cross-sectional areas sufficient substantially to prevent flow of said fluid past said piston in said first portion of said cylinder, said second portion of said cylinder extending from a first end of said cylinder at least to the edge of said port adjacent to said first portion of said cylinder, at least a second portion of said piston and said second portion of said cylinder having relative cross-sectional areas sufficiently different to permit impeded flow therebetween when said piston is in said second portion of said cylinder and the cross-sectional area of said first portion of said piston being equal to the cross-sectional area of said second portion of said piston and the cross-sectional area of said second portion of said piston being less than the cross-sectional area of said second portion of said cylinder; and c. means for displacing said piston in said cylinder, whereby the displacement of said piston is snubbed rapidly as the leading edge of said piston passes said port and is thereafter snubbed gradually as the leading edge of said piston continues its displacement in said second portion of said cylinder.

20. A self-snubbing miniaturized piston assembly as claimed in claim 19 wherein the passage of working fluid between said piston and the first of portion of said cylinder is prevented solely by the close fit therebetween.

21. A self-snubbing miniaturized piston assembly comprising:

a. a cylinder having a diameter on the order of one-eighth inch adapted to contain a working fluid, said cylinder also having spaced from an end thereof a port having a cross-sectional area sufficiently large to permit unimpeded flow of said working fluid, said cylinder having a cylinder end portion and a central cylinder portion, said cylinder end portion extending from a first end of said cylinder to the edges of said port adjacent to said central portion of said cylinder;

b. a piston having a diameter on the order of one-eighth inch disposed for reciprocal displacement in said cylinder, said piston having a piston end portion and a central piston portion, said piston having a cross-sectional area at at least said central piston portion sufficient substantially to prevent the flow of said fluid past said piston and said central cylinder portion, said piston and cylinder end portion having piston and cylinder walls with said piston wall adapted to be slidably contained within said cylinder wall with said walls in confronting spaced relationship, defining a very thin conduit space between said cylinder wall and said piston wall only during presence of said piston end portion within said cylinder end portion to valve said port by permitting only impeded flow of said fluid in either direction between said port and said cylinder end portion through said conduit space between said piston wall and said cylinder wall and permitting relatively unimpeded flow of fluid in either direction between said port and said cylinder in the absence of said piston end portion from said cylinder end portion, the cross-sectional area of said piston end portion being equal to the cross-sectional area of said central piston portion and the cross-sectional area of said cylinder central portion being less than the cross-sectional area of said cylinder end portion; and c. means for displacing said piston in said cylinder, whereby the displacement of said piston is snubbed rapidly as the leading edge of said piston end portion passes said port towards said cylinder end portion.

22. A self-snubbing miniaturized piston assembly as claimed in claim 21 wherein the passage of working fluid between the central piston portion and the central cylinder portion is prevented solely by the close fit therebetween.

* * * * *